United States Patent [19]

Gardiner et al.

[11] Patent Number: 5,464,691

[45] Date of Patent: Nov. 7, 1995

[54] LAMINATED BARRIER FILM

[75] Inventors: Eric S. Gardiner, Westtown; Thomas Z. Fu, Bayside, both of N.Y.

[73] Assignee: Arizona Chemical Company, Panama City, Fla.

[21] Appl. No.: 279,631

[22] Filed: Jul. 22, 1994

[51] Int. Cl.$^6$ .................................................. B32B 7/12
[52] U.S. Cl. .................... 428/336; 428/36.3; 428/412; 428/483; 428/500; 428/515; 524/252; 524/287; 156/244.11
[58] Field of Search ................................. 428/336, 500, 428/412, 515, 483, 36.6; 524/252, 287; 156/242, 244.11

[56] References Cited

U.S. PATENT DOCUMENTS

| | | | |
|---|---|---|---|
| 3,313,754 | 4/1967 | Logan | 260/27 |
| 3,442,838 | 5/1969 | Hoshi et al. | 260/23 |
| 3,463,752 | 8/1969 | Bornstein | 260/27 |
| 3,474,059 | 10/1969 | Body | 260/27 |
| 3,557,039 | 1/1971 | McIntyre et al. | 260/29.2 |
| 3,574,053 | 4/1971 | Hine et al. | 162/168 |
| 3,607,808 | 9/1971 | Thompson et al. | 260/27 |
| 3,652,473 | 3/1972 | Quinn et al. | 260/23 |
| 3,664,981 | 5/1972 | Mahlman | 260/27 |
| 3,892,575 | 7/1975 | Watts et al. | 96/84 R |
| 4,013,622 | 3/1977 | DeJuneas et al. | 260/45.95 |
| 4,207,220 | 6/1980 | Godfrey | 260/27 |
| 4,698,246 | 10/1987 | Gibbons et al. | 428/35 |
| 4,701,360 | 10/1987 | Gibbons et al. | 428/35 |
| 4,731,291 | 3/1988 | Kerkhoff et al. | 428/342 |
| 4,789,575 | 12/1988 | Gibbons et al. | 428/34.2 |
| 4,806,399 | 2/1989 | Gibbons et al. | 428/34.2 |
| 4,863,801 | 9/1989 | Vallarino | 428/414 |
| 4,888,222 | 12/1989 | Gibbons et al. | 428/34.2 |
| 4,895,757 | 1/1990 | Wysk et al. | 428/323 |
| 5,002,833 | 3/1991 | Kinsey, Jr. et al. | 428/475.8 |
| 5,190,816 | 3/1993 | Gardiner et al. | 428/343 |
| 5,271,991 | 12/1993 | Gardiner et al. | 428/195 |
| 5,272,196 | 12/1993 | Gardiner | 524/583 |
| 5,328,951 | 7/1994 | Gardiner | 524/287 |

OTHER PUBLICATIONS

David E. Bergbreiter and B. Srinivas, "Surface Selectivity in Blending Polyethylene–Poly(ethylene glycol) Block Cooligomers into High–Density Polyethylene", *Macromolecules* vol. 25, No. 2, 1992.

*Primary Examiner*—Edith Buffalow
*Attorney, Agent, or Firm*—Luedeka, Neely & Graham

[57] ABSTRACT

This invention provides a barrier film for packaging comprising:

(a) a first layer containing a polyolefinic extrudate composed of a non-polar polyolefinic material containing an amount of an amphiphilic resin of the structure $$A\text{-}B\text{-}A'$$

sufficient to modify the surface energy of the polyolefinic extrudate, wherein each of A and A' is selected from an essentially non-polar hydrocarbonous group and B is an essentially polar group derived from a telechelic diol, and wherein the amount of amphiphilic resin ranges from about 0.05 to about 10% by weight of the total weight of the first layer; and (b) a second layer composed of a more polar material than the first layer bonded to the first layer, wherein the barrier film contains from about 0.0127 to about 0.508 millimeters thickness of the first layer and from about 0.0127 to about 0.508 millimeters thickness of the second layer and wherein the bonding strength between the first and second layers is greater than about 50 N/m in the absence of a tie layer.

32 Claims, No Drawings

LAMINATED BARRIER FILM

BACKGROUND

This invention relates to a laminated barrier film for packaging and methods therefor.

Polyolefinic materials such as low density polyethylene (LDPE), polypropylene (PP), polybutylene (PB), and polystyrene (PS), are used in high volumes by the packaging industry as one component of a laminate composite film for coating substrates such as paper, metal foils, nonwoven fabrics and the like. Such polyolefinic materials have substantially non-polar characteristics and thus are not typically well suited for adhesion to polar materials used to form some laminate composite films. Methods for increasing the adhesion between a polar and a non-polar film of a composite construction include the use of tie-layers having characteristics compatible with both the polar and non-polar films, and increasing the surface energy of one or both of the films by corona discharge methods and/or flame treatment methods. All of these prior methods require complicated fabrication techniques, thus the formation of such composite materials has heretofore been limited to particular manufacturing facilities.

When the non-polar polyolefinic layer is combined with a more polar polymeric layer such as ethylene vinyl alcohol copolymer, glycol modified polyethylene terephthalate, or polycarbonate, the laminate composite material thus formed is an effective barrier film. Such barrier films are useful for coating paperboard food containers to reduce the oxidation of perishable substances such as fruit juice, milk, and the like within the containers.

The laminate composite coatings useful as barrier films are typically extruded onto the substrate to be coated. The extrusion of non-polar polyolefin and more polar polymeric layers onto paperboard to produce barrier packaging materials is well known. See for example, U.S. Pat. Nos. 4,698,246; 4,701,360; 4,789,575; 4,806,399; 4,888,222; and 5,002,833.

In the production of laminated barrier films, the corona discharge method for obtaining adhesion between the non-polar and more polar layers produces a metastable oxidized high energy surface on the surface of the non-polar film. Such corona discharge high energy surface reverts back to a lower energy level after about 3 to 4 weeks. Hence, the shelf-life of the non-polar layer is relatively short requiring that the extrusion facilities be located in proximity to the barrier film facilities.

When a tie-layer is used to increase the adhesion between the more polar and the non-polar layers of a barrier film it is typically co-extruded with one or both of the films. The so called "tie-layer" is generally a chemically modified polymer which is compatible with the more polar and the non-polar layers and which can provide a suitable interface between the two dissimilar layers. In order to extrude a barrier film containing the tie-layer material, it is necessary, however, to utilize an additional extruder barrel, and a more complicated die feed-block arrangement. As a result of the added expense of such multiple extruders and complicated feed-block arrangements, prior construction of barrier films was limited to packaging facilities having the required co-extrusion equipment.

It is therefore an object of this invention to provide a laminated barrier film for packaging.

Another object of this invention is to provide a laminated barrier film formed from at least one non-polar first layer and at least one more polar second layer.

A further object of this invention is to provide a laminated barrier film formed from a non-polar first layer and a more polar second layer in the absence of a tie-layer.

It is yet another object of this invention to provide a method for forming a laminated barrier film.

A still further object of this invention is to provide a method for forming a laminated barrier film which method does not require the use of an additional extruder barrel and/or a complicated feed-block arrangement.

Other objects and benefits of the invention will be evident from the following discussion and appended claims.

THE INVENTION

With regard to the foregoing objects of the invention, it has now been discovered that a laminated barrier film can be formed which does not require the presence a tie-layer between a first layer formed from a non-polar polymeric material and a second layer formed from a more polar polymeric material in order to achieve adequate adhesion between the first and second layers of a barrier film. Accordingly, the barrier film of this invention may be formed at packaging facilities which do not have an additional extruder barrel for the tie-layer and/or complicated feed-block co-extrusion equipment. Furthermore, the barrier film can be formed without the need for corona discharge or flame treatment, thus effectively increasing the shelf-life of one or more of the components of the barrier film.

In one of its embodiments, this invention provides a barrier film for packaging comprising a first layer containing a polyolefinic extrudate composed of a non-polar polyolefinic material containing an amount of amphiphilic resin of the structure

A-B-A' sufficient to modify the surface energy of the extrudate wherein the amount of amphiphilic resin in the extrudate ranges from about 0.05 to about 10% by weight of the total weight of the first layer. In the formula, each of A and A' is selected from an essentially non-polar hydrocarbonous group and B is an essentially polar group derived from a telechelic diol. The barrier film also contains a second layer composed of a more polar thermoplastic material than the first layer bonded to the first layer such that the barrier film preferably contains from about 0.0127 to about 0.508 millimeters thickness of the first layer and from about 0.0127 to about 0.508 millimeters thickness of the second layer. The bonding strength obtained between the first and second layers of the barrier film, in the absence of a tie-layer, is greater than about 50 N/m.

A key feature of this invention is the absence of a tie-layer between the first and second layers thus simplifying the construction of barrier films. Not only does the present invention reduce the need for an additional extruder barrel, but it also allows for the use of simpler extruder feed-block arrangements. Accordingly, the barrier film of this invention may be produced even at facilities which do not have the complicated feed-blocks required for barrier films containing a tie-layer.

In another embodiment, this invention provides a method for forming a laminated barrier film. The method comprises admixing a non-polar polyolefinic compound with from about 0.05 to about 10% by weight of an amphiphilic resin of the structure

A-B-A' wherein each of A and A' is an essentially non-polar hydrocarbonous group and B is an essentially polar group derived from a telechelic diol. The mixture of non-polar polyolefinic compound and amphiphilic resin is then extruded into a first layer while contacting at least one surface of the first layer with a polar media. Suitable polar media include air, carbon dioxide, water vapor, steel, glass and the like, with air being the most preferred polar media. When the polar media used is a gas such as air or carbon dioxide, the gas need not be dry, as a gas containing water vapor may also be used. The only criteria for the polar media is that it be more polar than the second layer. Accordingly, for the purposes of this invention, air is considered the most preferred polar media since it is generally more polar than most hydrocarbonous materials. It will be recognized, however, that any media having a polarity greater than a hydrocarbonous material may be used to contact the surface of the first layer.

A second layer composed of a thermoplastic material having a polarity greater than the first layer is then bonded to the polar media-contacted surface of the first layer. The absolute polarities of the first and second layers are not critical to the invention, provided there is a sufficient difference in polarity to achieve the purposes of this invention. Accordingly, for the purposes of this invention, the bonding strength obtained between the first layer and the second layer is typically greater than about 50 N/m, even in the absence of a tie-layer. Furthermore, the thickness of each layer of the barrier film thus formed will preferably range from about 0.0127 to about 0.508 millimeters.

In order to form the first layer, a non-polar polyolefinic material is admixed with an amphiphilic resin of the structure

A-B-A' wherein each of A and A' is selected from an essentially non-polar hydrocarbonous group and B is an essentially polar group derived from a telechelic diol. The non-polar polyolefinic material may be selected from polyethylene, polypropylene, alpha-olefin modified polyethylene and polypropylene, polybutylene, polystyrene, poly (4-methyl 1-pentene), or mixtures of two or more of the foregoing. It is preferred that the polyolefinic material be polyethylene or polypropylene, most preferably, low density polyethylene (LDPE). While it is preferred to utilize a single polyolefinic material in the mixture, it should be recognized that mixtures of two or more polyolefinic materials may be used provided the mixture contains the amount of amphiphilic resin required to achieve the purposes of this invention. Accordingly, the amount of polyolefinic material in the admixture may range from about 90% to about 99.5% of the total mixture, more preferably from about 93% to about 99.5% and most preferably from about 97% to about 99.5% of the total mixture.

The preferred amphiphilic resin is a compound of the formula $RD(CHR^2\{CH_2\}_n D^1)_m R^1$ wherein each of R and $R^1$ is selected from the group consisting of alkyl, aryl, alkyaryl, acyl and arylacyl derivatives of an aliphatic or aliphatic/aromatic mono-acid with a molecular weight of from about 200 to about 500 grams, each of $R^2$ and $R^3$ is selected from the group consisting of H, $CH_3$ and $C_2H_5$, each of D and $D^1$ is selected from the group consisting of O, $-NR^3-$, carbonyl and S, m is an integer from 2 to 20 and n is an integer from 0 to 3.

Examples of alkyl, aryl, alkylaryl, acyl and arylacyl derivatives of an aliphatic or aliphatic/aromatic mono-acid with molecular weights of from about 200 to about 500 grams include, but are not restricted to, alkylbenzenes, aliphatic alcohols, acyl derivatives of saturated fatty acids having carbon atom chain lengths of from about 10 to 26 atoms, soya and tall oil fatty acids, alkylbenzoic acids and tall oil, wood and gum rosin acids, and the like.

In a more preferred amphiphilic resin, R and $R^1$ are the same and are most preferably lipophilic rosin; $R^2$ is hydrogen; each of D and $D^1$ is O; n is 2; and m is an integer from 7 to 12, most preferably 9. In another preferred amphiphilic resin, R and $R^1$ are the same and are most preferably lipophilic rosin; $R^2$ is hydrogen; each of D and $D^1$ is NH; n is 2; and m is an integer from 7 to 12, most preferably 9. In yet another preferred amphiphilic resin, R and $R^1$ are the same and are most preferably lipophilic rosin; $R^2$ is hydrogen; each of D and $D^1$ is a carbonyl group; n is 2 and m is an integer from 7 to 12, most preferably 9.

The amphiphilic resin is generally formed by the reaction of polyglycols, polyimines, polyesters or polysulfides with hydrophobes such as fatty acids, rosin acids, alkylphenols or aryl or aliphatic alcohols. The chain length of the hydrophilic segment, polyethylene glycol, for example, varies from 2 to 20 units (where a unit is composed of 1, 2, 3 or 4 carbon atoms and one polar group, i.e. an oxygen, nitrogen or sulfur atoms or carboxyl group) with a preferred length of about 9 units. The hydrophobes or lipophilic groups generally have chain lengths of from about 10 to about 26 carbon atoms. The preferred aromatic, aliphatic or mixed alcohols generally have molecular weights from about 200 to about 500 grams.

There is a preferable limitation to the length of the hydrophilic portion of the amphiphilic resin. At lengths of 2 units the addition of the amphiphilic resin to the polyolefinic material does not significantly increase the surface energy of the first layer. At chain lengths of above 20 units, although there may be initial improvement in surface energy, the amphiphilic resin leaches easily into aqueous liquids. This results in an eventual lowering of the surface energy of the first layer and consequently a loss in bonding strength.

The amount of amphiphilic resin admixed with the polyolefinic material is that amount sufficient to modify the surface energy of the polyolefinic material with which it is mixed. Typically the amount of amphiphilic resin in the mixture ranges from about 0.2% to about 10.0% by weight of the total mixture, more preferably from about 0.5% to about 7.0% and most preferably from about 0.5% to about 3.0% by weight of the total mixture. Above a concentration of 10% by weight, there is evidence of significant phase separation between the amphiphilic resin and the polyolefinic material and subsequently little change in the surface energy of the polyolefinic layer.

Methods for forming the admixture of polyolefinic material and amphiphilic resin are well known. Accordingly, the polyolefinic material may be admixed by melt blending the two components, blending two solutions containing the polyolefinic material and amphiphilic resin, blending the two components in a high shear mixer, or adding the amphiphilic resin as a solid or liquid to the polyolefinic material during extrusion. Alternatively, the amphiphilic resin may be added to the polyolefinic material during work-up immediately after polymerization. The order in which the two components is mixed is not believed to be critical to the invention. Accordingly, the amphiphilic resin may be added to the polyolefinic material or the polyolefinic material may be added to the amphiphilic resin.

The increase in surface energy of the first layer is determined by comparing the energetic data of an unmodified polyolefinic layer, such as polyethylene, against the energetic data of a surface energy modified polyolefinic layer, such as obtained from extruding the admixture of polyethylene and amphiphilic resin described herein. The layers are tested by measuring the T-peel strength required to separate the first layer from a more polar second layer such as ethylene vinyl alcohol. In the T-peel measurement, a layer of polyolefinic material or surface energy modified polyolefinic material is extruded onto a substrate such as paperboard. The more polar second layer is then compression molded to the first layer. The amount of force (measured in N/m) needed to peel the second layer away from the first layer at an angle of 90° is called the T-peel strength.

Without being bound by theoretical considerations, the amphiphilic resin has been found to significantly increase the surface energy of the first layer upon exposure of at least one surface of the first layer to a polar media such as air, preferably cooling air during the extrusion process. It is believed that the polar media causes migration of at least a portion of the amphiphilic resin to the surface of the first layer resulting in a modification of the surface energy of the first layer. If a cross-section of the first layer is analyzed for the determination of its chemical constituents, the polar media contacted surface of the first layer would be found to contain more of the amphiphilic resin than the interior of the first layer. If the first layer is not contacted with a polar media, analysis of the first layer would indicate that there is more of an even distribution of amphiphilic resin throughout the cross-section of the first layer. It will be recognized that even in the absence of contact with a polar media, there may be more of the amphiphilic resin near the surface of the first layer, however, the amount of amphiphilic resin near the surface of the first layer will generally be insufficient to significantly increase the bonding strength of the first and second layers in the absence of contacting the surface of the first layer with a polar media.

Unlike surface energy increased by corona discharge, the surface energy of the first layer of this invention has been found not to decrease significantly over a period of months. Consequently, the first layer may be stored for long periods of time, and/or shipped to remote locations for barrier film formation. While it is preferred to expose at least one surface of the first layer to a polar media during the extrusion process, it is quite acceptable to expose both surfaces of the first layer to a polar media, and in some cases this may be preferred, particularly where an increase in the surface energy of both surfaces of the first layer is preferred.

Another key feature of this invention is the use of a second layer composed of a more polar material bonded to the first layer in a manner sufficient to form the improved barrier film of this invention. The second layer may be selected from the group consisting of ethylene vinyl alcohol (EVOH), polyethylene terephthalate (PET) and glycol-modified polyethylene terephthalate (PETG), polybutylene terephthalate (PBT), and polycarbonate (PC). A preferred EVOH polymeric material is sold under the trade name EVAL EP resin and is available from Kuraray Co. Ltd. of Osaka, Japan. A preferred PETG polymeric material is Kodak KODABOND Copolyester 5116 which is available from Eastman Chemical Products Inc., of Kingsport, Tenn. A preferred PC polymeric material is LEXAN 104-111 resin which is available from The General Electric Company of Schenectady, N.Y.

The second layer may be bonded to the first layer in any number of well known ways. Accordingly, the second layer may be extruded onto a surface-energy modified surface of the first layer. Alternatively, the second layer may be compression molded to a surface-energy modified surface of a first layer which has been extruded onto a paperboard substrate. While sequential extrusion of the second layer onto a surface-energy modified surface of the first layer is preferred, the first and second layers may also be co-extruded, provided the surface of the first layer to be contacted with the second layer is sufficiently modified by exposure to a polar media during the extrusion process. The first layer need not be bonded to a substrate prior to bonding with the second layer, however, having the first layer bonded to a substrate prior to bonding the second layer to the first layer may simplify the manufacturing process.

When the first and second layers are bonded together without bonding the first layer to a substrate, the barrier film thus formed may then be bonded to a paper or paperboard substrate by applying a uniform coating of a suitable polarity hot-melt adhesive or acrylic latex adhesive to the exposed surface of the first layer. Use of an acrylic latex adhesive will allow more time for bonding the barrier film to the substrate. Application methods for such latex adhesives include roll, blade, air-knife, or jet application to the substrate and/or composite barrier film. When a hot melt adhesive is used, immediate assembly of the barrier film and substrate is preferred unless the hot-melt adhesive is also pressure-sensitive when cool. Alternatively, the first layer may be co-extruded with an unmodified polyethylene polymeric material as the substrate contact layer and the polar layer then extruded or compression molded onto a surface energy modified surface of the first layer.

While the foregoing description generally relates to the formation of barrier films from two discrete layers, the barrier film may contain any number of layers provided it contains at least one first layer comprising a polyolefinic extrudate composed of a non-polar polyolefinic material containing an amount of an amphiphilic resin sufficient to modify the surface energy of the first layer and at least one second layer composed of a more polar material than the first layer bonded to the first layer. Regardless of the number of layers utilized in the barrier film, suitable barrier films will preferably contain from about 0.0127 to about 0.508 millimeters thickness of the first layer and from about 0.0127 to about 0.508 millimeters thickness of the second layer.

When the first layer is extruded directly onto a substrate without co-extruding an unmodified polyolefinic material therewith, it is preferred that the amount of amphiphilic resin in the mixture be within the range of from about 0.5 to about 2.0% by weight of the mixture. When a co-extrusion of the first layer with an unmodified polyolefinic resin is desired, the thickness of each layer (formed from modified and unmodified polyolefinic resins) may be in any amount needed to provide the total desired first layer thickness. However, it is more preferred that the thickness of the layer formed from the modified polyolefinic material be equal to or less than the thickness of the layer formed from the unmodified polyolefinic material. In either case, the second polar layer may be extruded or compression molded to a surface energy modified surface of the first layer.

In order to provide a further understanding of the present invention the following examples are given to illustrate, but not to limit the invention.

EXAMPLE 1

An amphiphilic resin was prepared by the esterification of tall oil rosin acid (520 grams) (ACINTOL R Type S tall oil rosin, Arizona Chemical Company) with polyethylene glycol (300 grams, 0.75 mols) (CARBOWAX type, Union Carbide, molecular weight of 400). Slightly over two equivalent weights of the polyethylene glycol were reacted with the tall oil rosin, in the presence of 0.6 grams (10 mmols) phosphorous acid catalyst at 260° C. for 29 hours. The reaction was carried out under a nitrogen blanket with stirring and an exit condenser to condense and remove water formed during the esterification step. The resulting amphiphilic resin had an acid number of 11 mg KOH/g of product and a Gardner color of 7. The amphiphilic resin was a viscous liquid produced in 94% yield.

EXAMPLE 2

An amphiphilic resin was prepared by the esterification of stearic acid (350 grams, 1.23 mols) with polyethylene glycol (249 grams, 0.62 mols) (CARBOWAX type, Union Carbide, molecular weight of 400). Slightly over two equivalent weights of the polyethylene glycol were reacted with the tall oil rosin, in the presence of 0.5 grams (3 mmols) para-toluene sulfonic acid catalyst at 220° C. for 20 hours. The reaction was carried out under a nitrogen blanket with stirring and an exit condenser to condense and remove water formed during the esterification step. The resulting amphiphilic resin had an acid number of 4 mg KOH/g of product and a Gardner color of 2 (molten color). The amphiphilic resin was a viscous liquid produced in 98% yield.

EXAMPLE 3

An amphiphilic resin was prepared by the esterification of palmitic acid (406 grams, 1.58 mols) with polyethylene glycol (300 grams, 0.75 mols) (CARBOWAX type, Union Carbide, molecular weight of 400). Slightly over two equivalent weights of the polyethylene glycol were reacted with the tall oil rosin, in the presence of 0.6 grams (10 mmols) phosphorous acid catalyst at 220° C. for 22 hours. The reaction was carried out under a nitrogen blanket with stirring and an exit condenser to condense and remove water formed during the esterification step. The resulting amphiphilic resin had an acid number of 6 mg KOH/g of product and a Gardner color of 2 (molten color). The amphiphilic resin was a viscous liquid produced in 98% yield.

EXAMPLE 4

An amphiphilic resin was prepared by the esterification of tall oil fatty acid (208 grams) (ACINTOL EPG tall Oil fatty acid, Arizona Chemical Company) with polyethylene glycol (249 grams, 0.62 mols) (CARBOWAX type, Union Carbide, molecular weight of 400). Slightly over two equivalent weights of the polyethylene glycol were reacted with the tall oil rosin, in the presence of 0.3 grams (3 mmols) phosphoric acid catalyst at 220° C. for 22 hours. The reaction was carried out under a nitrogen blanket with stirring and an exit condenser to condense and remove water formed during the esterification step. The resulting amphiphilic resin had an acid number of 12 mg KOH/g of product and a Gardner color of 2. The amphiphilic resin was a viscous liquid produced in 98% yield.

In the following Table 1, the surface energetic data of unmodified LDPE, EVOH and modified LDPE are given. The samples were prepared by compression molding the modified and unmodified LDPE resins. The dispersive properties, $\gamma_s^d$ and $W_s^d$, characterize the interfacial wettability and long-range non-polar interaction forces, whereas the acid-base property $W_s^{ab}$, measures the short-range, polar interaction forces The higher the sum of $W_s^d$ and $W_s^{ab}$, the stronger the adhesion between the layers. The data indicate that the wettability or dispersive interaction forces of all of the materials are similar. However, surface energy modified LDPE possesses comparable or higher polar forces than EVOH. Accordingly, it is expected that the modified LDPE should adhere to the EVOH much better than the unmodified LDPE.

Table 2 illustrates the T-peel strength between EVOH and unmodified and modified LDPE containing different concentrations of amphiphilic resin. The samples for Table 2 were prepared by compression molding compression molded films of PETG or EVOH onto the corresponding samples from Table 1. A silicone-coated release liner was sandwiched along one edge of the compression molded laminates to provide a separation point. The T-peel strength was determined at a separation rate of 12 inches (30.5 cm) per minute at an angle of 90°.

TABLE 1

Surface Energetic Data

| Sample | Components | $Y_s^d$ (mN/m)[1] | $W_s^d$ (mN/m)[2] | $W_s^{ab}$ (mN/m)[3] |
|---|---|---|---|---|
| A | unmodified LDPE | 33 | 54 | 18 |
| B | EVOH | 35 | 55 | 32 |
| C | LDPE with 1.0 wt. % amphiphilic resin of Example 1 | 37 | 56 | 34 |
| D | LDPE with 1.5 wt. % amphiphilic resin of Example 1 | 33 | 53 | 51 |
| E | LDPE with 1.9 wt. % amphiphilic resin of Example 1 | 34 | 54 | 44 |
| F | LDPE with 0.5 wt. % amphiphilic resin of Example 4 | 37 | 56 | 46 |
| G | LDPE with 1.0 wt. % amphiphilic resin of Example 4 | 40 | 59 | 50 |
| H | LDPE with 1.5 wt. % amphiphilic resin of Example 4 | 37 | 56 | 36 |

[1]$Y_s^d$—dispersive component of solid surface free energy
[2]$W_s^d$—dispersive component of the work of adhesion between the solid layer and water
[3]$W_s^{ab}$—dispersive acid-base component of the work of adhesion between the solid layer and water

TABLE 2

| Sample | Average T-peel Strength (N/m) |
|---|---|
| A | 33 |
| C | 25 |
| D | 14 |
| E | 67 |
| F | 18 |
| G | 21 |
| H | 263 |

As illustrated in Table 2, for any particular non-polar polymeric material, there is a minimum threshold level of amphiphilic resin required to suitably modify the surface energy of the non-polar polymeric material. Such minimum level can readily be determined by a few simple empirical tests.

Having described the preferred embodiments of the invention and the benefits and advantages therefor, it will be recognized that variations of the invention may be made without departing from the spirit and scope of the appended claims.

What is claimed is:

1. A barrier film for packaging comprising:
   (a) a first layer containing a polyolefinic extrudate composed of a non-polar polyolefinic material containing an amount of an amphiphilic resin of the structure

A-B-A' sufficient to modify the surface energy of the polyolefinic extrudate, wherein each of A and A' is selected from an essentially non-polar hydrocarbonous group and B is an essentially polar group derived from a telechelic diol, and wherein the amount of amphiphilic resin ranges from about 0.05 to about 10% by weight of the total weight of the first layer; and
   (b) a second layer composed of a more polar material than the first layer bonded to the first layer,
   wherein the barrier film contains from about 0.0127 to about 0.508 millimeters thickness of the first layer and from about 0.0127 to about 0.508 millimeters thickness of the second layer and wherein the bonding strength between the first and second layers is greater than about 50 N/m in the absence of a tie layer.

2. The barrier film of claim 1 wherein the polyolefinic material is selected from polyethylene, polypropylene, polybutylene, and polystyrene.

3. The barrier film of claim 2 wherein the polyolefinic material is low density polyethylene.

4. The barrier film of claim 1 wherein the more polar material is selected from ethylene vinyl alcohol copolymer, glycol modified polyethylene terephthalate, and polycarbonate.

5. The barrier film of claim 1 wherein the amphiphilic resin is a compound of the formula $RD(CHR^2\{CH_2\}_nD^1)_mR^1$ wherein each of R and $R^1$ is selected from the group consisting of alkyl, aryl, alkyaryl, acyl and arylacyl derivatives of an aliphatic or aliphatic/aromatic mono-acid with a molecular weight of from about 200 to about 500 grams, each of $R^2$ and $R^3$ is selected from the group consisting of H, $CH_3$ and $C_2H_5$, each of D and $D^1$ is selected from the group consisting of O, —$NR^3$—, carbonyl and S, m is an integer from 2 to 20 and n is an integer from 0 to 3.

6. The barrier film of claim 5 wherein R and $R^1$ are the same, each of D and $D^1$ is O, n is 2, and m is an integer from 7 to 12.

7. The barrier film of claim 6 wherein m is 9.

8. The barrier film of claim 6 wherein R and $R^1$ are rosin.

9. The barrier film of claim 5 wherein R and $R^1$ are the same, each of D and $D^1$ is NH, n is 2 and m is an integer from 7 to 12.

10. The barrier film of claim 9 wherein m is 9.

11. The barrier film of claim 9 wherein R and $R^1$ are rosin.

12. The barrier film of claim 5 wherein R and $R^1$ are the same, each of D and $D^1$ a carbonyl group, n is 2 and m is an integer from 7 to 12.

13. The barrier film of claim 12 wherein m is 9.

14. The barrier film of claim 12 wherein R and $R^1$ are rosin.

15. A method for forming a laminated barrier film comprising:
    a) admixing a non-polar polyolefinic compound with from about 0.05 to about 10% by weight of an amphiphilic resin of the structure

A-B-A' wherein each of A and A' is an essentially non-polar hydrocarbonous group and B is an essentially polar group derived from a telechelic diol;
    b) extruding the mixture of (a) into a first layer while contacting at least one surface of the first layer with a polar media; and
    c) bonding a second layer composed of a more polar material than the first layer to a polar media-contacted surface of the first layer of step (b),
    whereby the bonding strength between the extrudate of step, (b) and the polar thermoplastic material is greater than about 50 N/m in the absence of a tie-layer, and wherein each of the first and second layers has a thickness ranging from about 0.0127 to about 0.508 millimeters.

16. The method of claim 15 wherein the polar media is air.

17. The method of claim 16 wherein both surfaces of the first layer are contacted with air during the extrusion step.

18. The method of claim 15 wherein the second layer is compression molded to an polar media-contacted surface of the first layer of step (b).

19. The method of claim 15 wherein the second layer is extruded onto an polar media-contacted surface of the first layer of step (b).

20. The method of claim 15 wherein the polyolefinic compound is selected from polyethylene, polypropylene, polybutylene, and polystyrene.

21. The method of claim 15 wherein the polyolefinic compound is low density polyethylene.

22. The method of claim 15 wherein the more polar material is selected from ethylene vinyl alcohol copolymer, glycol modified polyethylene terephthalate, and polycarbonate.

23. The method of claim 15 wherein the amphiphilic resin is a compound of the formula $RD(CHR^2\{CH_2\}_nD^1)_mR^1$ wherein each of R and $R^1$ is selected from the group consisting of alkyl, aryl, alkyaryl, acyl and arylacyl derivatives of an aliphatic or aliphatic/aromatic mono-acid with a molecular weight of from about 200 to about 500 grams, each of $R^2$ and $R^3$ is selected from the group consisting of H, $CH_3$ and $C_2H_5$, each of D and $D^1$ is selected from the group consisting of O, —$NR^3$—, carbonyl and S, m is an integer from 2 to 20 and n is an integer from 0 to 3.

24. The method of claim 23 wherein R and $R^1$ are the same, each of D and $D^1$ is O, n is 2, and m is an integer from 7 to 12.

25. The method of claim 24 wherein m is 9.

26. The method of claim 24 wherein R and $R^1$ are rosin.

27. The method of claim 23 wherein R and $R^1$ are the same, each of D and $D^1$ is NH, n is 2 and m is an integer from 7 to 12.

28. The method of claim 27 wherein m is 9.

29. The method of claim 27 wherein R and R1 are rosin.

30. The method of claim 23 wherein R and $R^1$ are the same, each of D and $D^1$ is a carbonyl group, n is 2 and m is an integer from 7 to 12.

31. The method of claim 30 wherein m is 9.

32. The method of claim 30 wherein R and $R^1$ are rosin.

* * * * *